June 29, 1965

O. A. KUHL ETAL 3,192,054

FOOD IRRADIATOR AND METHOD

Filed Sept. 19, 1962

INVENTORS
OTTO A. KUHL
ADOLPH B. OLTMANN
BY

June 29, 1965　　　O. A. KUHL ETAL　　　3,192,054
FOOD IRRADIATOR AND METHOD

Filed Sept. 19, 1962　　　　　　　　　　　3 Sheets-Sheet 2

INVENTORS
OTTO A. KUHL
ADOLPH B. OLTMANN
BY

United States Patent Office 3,192,054
Patented June 29, 1965

3,192,054
FOOD IRRADIATOR AND METHOD
Otto A. Kuhl, Northport, and Adolph B. Oltmann, Bayport, N.Y., assignors to the United States of America as represented by the United States Atomic Energy Commission
Filed Sept. 19, 1962, Ser. No. 224,879
12 Claims. (Cl. 99—214)

This invention relates to irradiation processing of foodstuffs, and more particularly to apparatus and method for the effective utilization of a radioactive source in the radiation pasteurization of foodstuffs.

Early workers in the field of irradiation processing of foodstuffs subjected perishable foodstuffs to massive dosages of ionizing irradiation for the purpose of complete sterilization of the foodstuffs. Attainment of complete sterilization would permit indefinite prolongation of the storage capabilities of non-refrigerated foodstuffs. Unfortunately, the massive dosages of ionizing radiation required to bring about complete sterilization cause undesirable alterations in the texture, color, and flavor of the treated foodstuff.

For these and other reasons, recent trends in this field have been away from sterilization and towards that of radiation pasteurization. In this connection, pasteurization means irradiation at a dosage sufficiently below that required for sterilization to avoid detectable alterations of texture, color, and flavor, but enough to prolong the shelf-life of perishable foodstuffs for a limited period of time in the presence of refrigeration. Irradiation pasteurization of fish, for example, would make this highly perishable food product available in substantially fresh form to regions presently beyond the areas of normal consumption.

As might be expected, irradiation dosages of foodstuffs for the purposes described above must be kept between limitations of sufficient irradiation to accomplish the pasteurization and excessive exposure to avoid the undesirable side effects. In addition, close control is required to assure a uniformity of dosage throughout each food package and successive units undergoing the irradiation. Furthermore, due to the expense of the sources required, it is necessary to obtain the most efficient use of a particular source in order to assure that the expense involved in irradiation pasteurization will not become prohibitive.

In the latter connection, proposed arrangements generally suffer the disability that they are very inefficient and occupy excessive floor area. Inefficient utilization of available irradiation energy when coupled with the need for large floor areas tends to yield costs which are high and thus inhibit widespread acceptance of irradiation pasteurization. Further, irradiation energy which is not attenuated and absorbed in the package foodstuffs, must be attenuated and absorbed in a shielding material surrounding the irradiation device, which adds additional costs to an installation for this purpose. Therefore, an inefficient arrangement of packages in relation to the source means greater capital and related expenses, including that due to the requirement of more sources which could perhaps be eliminated by the efficient utilization of few sources.

The present invention combines to a greater degree than heretofore has ever been accomplished a degree of efficiency in the utilization of the sources and control over the irradiation of the food packages as to bring within the realm of possibility the economic feasibility of the radiation pasteurization of foods. In accordance with this invention, the food packages are suspended in a conveyor system which lines up the packages before one or more sources. The packages pass over the sources in spaced intervals of time and distance, and the sources are popped up and down between the packages to accomplish the desired result. The system is highly flexible in permitting convenient and ready adjustment of the amount of exposure of the packages without affecting directly the operation of the whole conveyor system and the speed of the packages being moved therealong. In addition, there is a minimum of loss of the radiation to the shielding walls as will be later seen.

It is thus a principal object of this invention to provide a facility for the efficient and effective irradiation pasteurization of packaged foodstuffs.

A further object of this invention is to provide an irradiation facility and method which achieves a high degree of irradiation energy utilization.

A still further object of this invention is to provide an irradiation pasteurization facility and method which requires a minimum amount of space in which the irradiation takes place, reducing shielding requirements.

A still further object of this invention is to provide apparatus for effecting the irradiation pasteurization of packaged foodstuffs which permits a high degree of control and flexibility in exercising control in the amount of radiation to which the packages are subjected.

Other objects and advantages of this invention will hereinafter become more evident from the following description of a preferred embodiment of the invention and the accompanying drawings in which.

Figure 1:
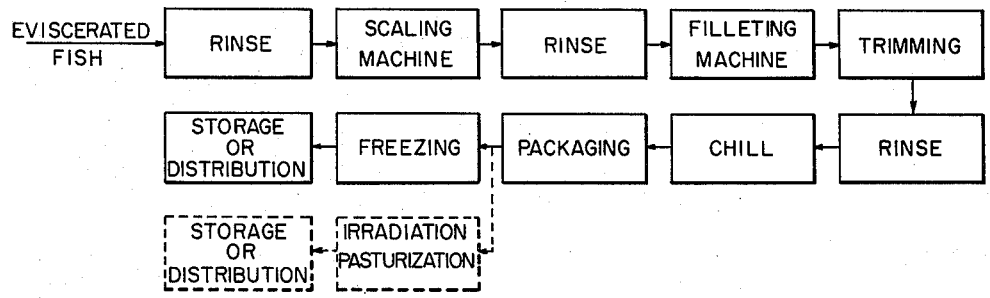
FIG. 1 is a diagrammatic arrangement of fish packaging and freezing facility and the modification which would be required to introduce irradiation pasteurization.

In FIG. 1 is illustrated a typical commercial arrangement for packaging and freezing fish for retail distribution. In this arrangement eviscerated fish is scaled, filleted, trimmed and packaged. Then the packaged fish is frozen and stored or distributed in its frozen state. In order to incorporate the present invention, the only modification of the arrangement in FIG. 1 required is as indicated in broken lines. Instead of the freezing and storage steps, the fish packages are irradiated and refrigerated for storage and distribution.

Figure 2:
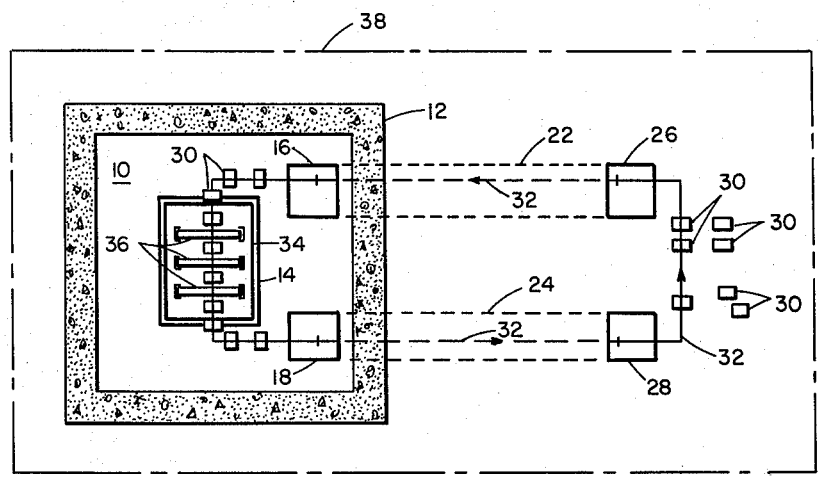
FIG. 2 is a schematic layout of the irradiation facility including the conveyor arrangement.

Referring to FIG. 2 for a facility designed in accordance with this invention, an irradiation room 10 is formed by walls 12 of thick radiation shielding material such as high density concrete and containing an elevator shaft 14 extending down from the floor. In addition, the floor of room 10 is provided with a pair of vertical downwardly extending tunnel shafts 16 and 18 which connect to a pair of substantially horizontal tunnels 22 and 24, respectively. The latter extend out of room 10 and terminate in a pair of vertical shafts 26 and 28, respectively, which open into a floor area used for feeding in and withdrawing the food packages 30. A continuous line or path 32 with arrow heads indicates the path of the packages 30 through the various shafts and tunnels into room 10 for irradiation and then return. Packages 30 are carried along path 32 by a conventional conveyer to be briefly described later, modified to carry out the principles of this invention. Within elevator shaft 14, an elevator 34 carries irradiation sources, plaques, or slabs 36 in a manner to be more particularly described further below. The whole arrangement just described may be located in a building 38 outlined in phantom.

Figure 3:
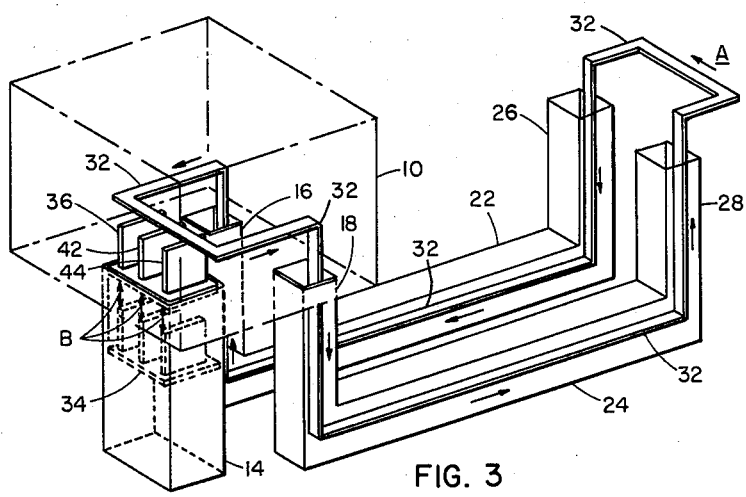
FIG. 3 is an isometric view of the facility shown in FIG. 2.

Referring to FIG. 3 for somewhat schematized details of the irradiation system, there are shown room 10 in phantom, source elevator shaft 14, and the conveyor passageways consisting of shafts 16, 18, tunnels 22, 24 and shafts 26, 28. The path of the packages 30 is along line 32 which is a schematic representation of a monorail which may be used as described below from the load-unload area A, down through shaft 26, tunnel 22, up shaft 16, and over elevator shaft 14, where irradiation takes place. The packages 30 are returned to area A through shaft 18, tunnel 24, and shaft 28.

Within elevator shaft 14, elevator 34 supports the three irradiation plaques 36 in spaced, upright positions as illustrated. Elevator 34 is normally movable as shown by arrows B between the positions illustrated. In the upper position of elevator 34, plaques 36 are located between adjacent packages for irradiating the latter. When in the lower position, (as shown in phantom) plaques 36 are retracted to permit movement of the packages across shaft 14. The bottom of elevator shaft 14 is a storage pit filled with water into which elevator 34 is retracted when the irradiation cell is not being used. The bottom of elevator shaft 14 would contain sufficient water to cover plaques 36.

Each of plaques 36 in the particular embodiment described is a gamma radiation source which consists of cobalt-60 sandwiched between stainless steel sheets forming a cladding, as is understood in the art. Each source plaque 36 is composed of a number of individual elements. For example, with an overall plaque size of 46" x 38", each source element is approximately 6.85" wide and 6.25" long. The cobalt metal when irradiated in the reactor would be nickel-plated and encapsulated in aluminum for activation. The individual cobalt-60 source elements then dejacketed from the aluminum irradiation containers are inserted into stainless steel envelopes, three to an envelope. The open end of the envelope is remotely welded and the assembly tested for leaks. Four of these subassemblies, 0.85" wide and 19" long, are in turn inserted into a larger stainless steel envelope, the open end of which is crimped, welded, and tested. A total of 24 of these assemblies, each 1.90" wide and 38" long (exclusive of 1" extensions at each end which are used to mount the assembly in a rack supported by elevator 34) make up each source plaque 36 having dimensions of 46" x 38". The construction of source plaques 36 does not form a part of this invention.

Figures 4A, 4B:
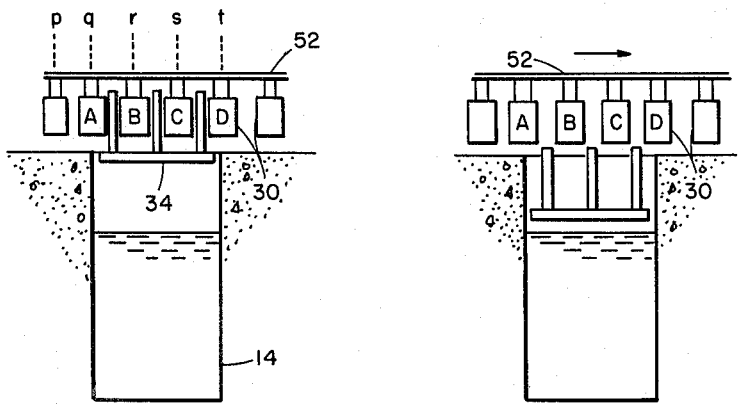
FIGS. 4a, 4b, 4c and 4d, show the sources and food packages arranged to demonstrate the sequence of operation to accomplish the irradiation pasteurization in accordance with this invention.
Figure 4C:
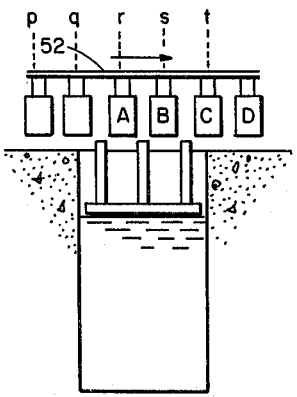
Figure 4D:
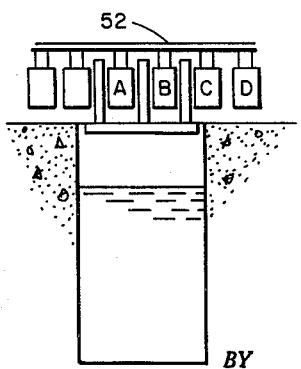

As was noted previously, packages 30 are conveyed suspended from an overhead conveyer system along path 32 directly over source elevator 14. As to be now described, food packages 30 are subject in turn to carefully controlled dosages of gamma irradiation to effect the "pasteurization" of the contents. In FIGS. 4a, 4b, 4c, and 4d, it will be seen that packages 30 are suspended from a conveyer monorail 52 and moved along in the direction indicated by the arrows in FIGS. 4b and 4c. In FIG. 4a, elevator 34 is in its upper position with plaques 36 extending between spaced packages 30A, 30B, 30C, and 30D, which are in stop positions, q, r, s, and t, for irradiating same. Package 30A is held in stop position p, waiting for its turn to be indexed across elevator shaft 14 in a manner to be described further below. In FIG. 4b, this period of irradiation is completed and elevator 34 is moved down to permit the packages to be indexed in the direction shown in FIG. 4c, that is, each package moved across to the next stop position. In FIG. 4d, elevator 34 is up again in its irradiation position.

It should be understood that this irradiation procedure can be carried out with one or two irradiation plaques and that the packages can be indexed two or even three or even more at a time when elevator 34 is down, in accordance with the amount of irradiation to be applied for this particular circumstance. It should also be noted that when elevator 34 is up none of the irradiation is wasted as all of it is being absorbed, not only by the directly facing packages 30 but the next ones in line by radiation energy passing through the packages.

Figure 7:
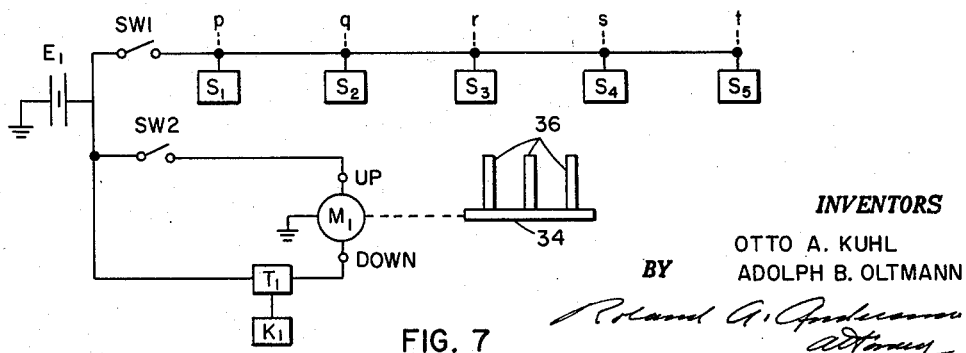
FIG. 7 is a schematic of an arrangement for controlling the indexing of the packages through the zone of irradiation.

The details of the conveyer system schematically illustrated are not a part of this invention and any commercially available arrangement capable of carrying out the movement of the packages as hereinbefore described may be utilized. However, for an example of construction suitable to carry out the principles of this invention reference is made to FIGS. 5, 6 and 7.

Figure 5:
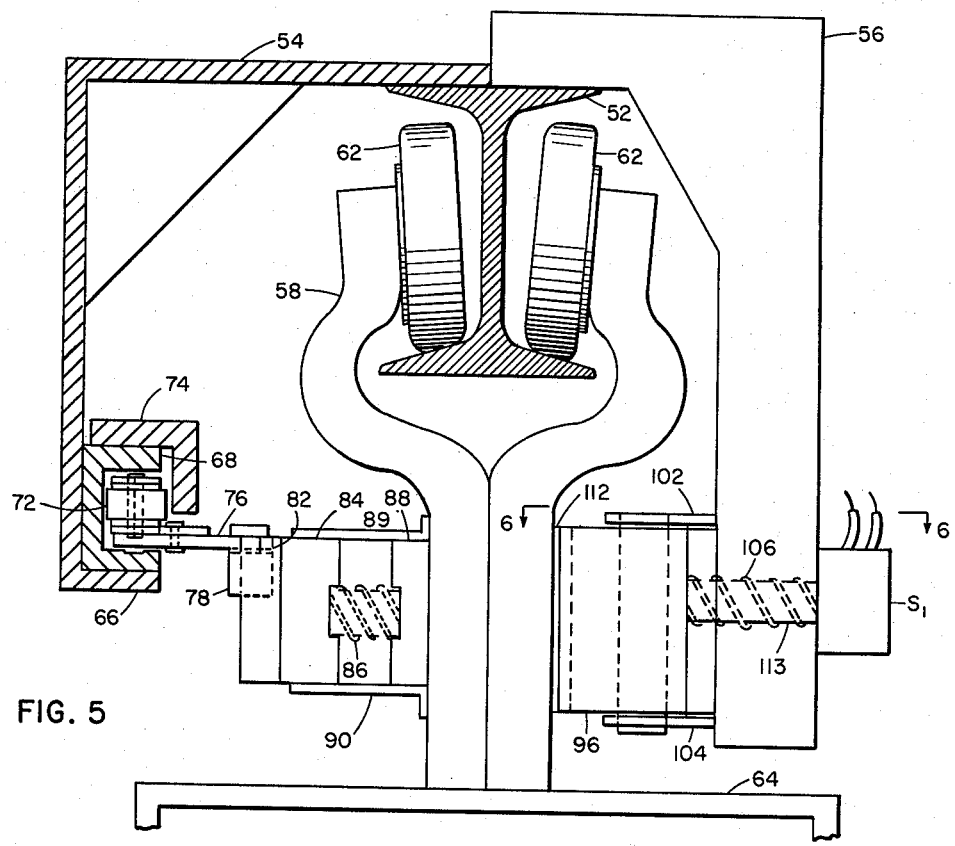
FIG. 5 is a section view of a portion of a monorail conveyor system taken through a package conveyor to illustrate a typical arrangement for moving the packages through the zone of irradiation.

Referring to FIG. 5, a typical conveyer system would consist of an overhead monorail or I-beam 52 supporting by a straphanger 54. Other hangers 56 are suspended along monorail 52 at each stop position for a purpose to be later described. A series of carriers 58 suspended from two or four free rolling rubber wheels 62 and supporting a carrier basket or frame 64 rides freely on monorail 52 in the manner illustrated as is well understood in the art. A package 30 would be located within each carrier frame 64.

The lower portion of straphanger 54 is provided with a shoulder 66 supporting a C-rail 68 in which an endless pusher chain 72 moves continuously. A member 74 attached in an appropriate manner prevents pusher chain 72 from sliding out of rail 68. Chain 72 is provided as is understood in the art with spaced pusher arms 76 supporting a pusher roller 78 mounted on a shaft 82 for rotation as shown. Each carrier 58 is provided with a spring loaded bevel pusher 84 biased by a spring 86 supported by a plate 88 attached to carrier 58. Side plates 89 and 90 help to support bevel pusher 84. The latter has bevelled sides so that when carrier 58 is locked against movement as will be later described pusher roller 78 will cause bevel pusher 84 to retract against spring 86 and continue its movement. When carrier 58 is freely movable on monorail 52 pusher chain 72 will keep carrier 58 rolling but any resistance to the movement of the latter will cause bevel pusher 84 to retract under the impact of roller 78 and thereby permit chain 72 to continue its movement. While not shown it is understood that endless pusher chain 72 is provided with appropriate pulleys and motor drive apparatus as is well established in the art.

Figure 6:
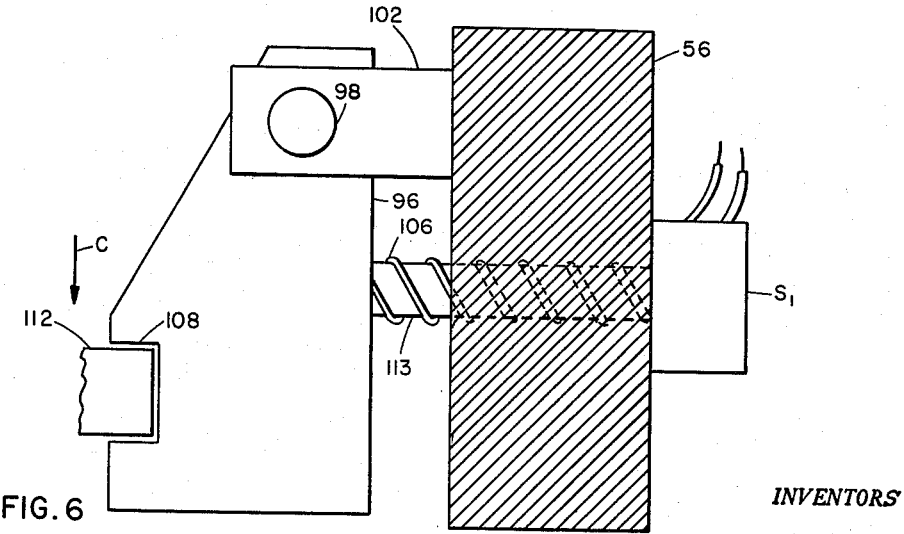
FIG. 6 is a view along 6—6 of FIG. 5.

It will be recalled from a discussion of the movement of packages 30 in connection with FIGS. 4a, 4b, 4c, and 4d, that several stopping points, p, q, r, s, and t, are required for carriers 58 to permit the irradiation of packages 30 in the manner described. For this purpose there is provided at each stopping point a hanger 56 which supports a latch 96 pivoted on a shaft 98 supported by arms 102 and 104. A spring 106 biases latch 96 out as shown in FIG. 6. Latch 96 is provided with a slot 108 to accommodate a carrier lock arm 112 which extends out from each carrier 58. Latch 96 has a bevelled portion so that carrier lock arm 112 moving in the direction shown by arrow C depresses latch 96 against spring 106 until arm 112 falls into slot 108 and locks carrier 58 against further movement. At this point as previously explained, roller 78 attached to pusher chain 72 will depress bevel pusher 84 and continue on its movement leaving carrier 58 locked in place.

In order to release carrier 58 there is provided a rod 113 extending from latch 96 through spring 106 and hanger 56 to solenoid $S_1$ mounted on hanger 56. Activation of solenoid $S_1$ retracts latch 96 against spring 106 and releases lock arm 112 from slot 108 thereby permitting the next pusher roller 78 to move carrier 58 and carry it on its way to the next locking point. It is quite obvious that with a solenoid system at each lock point for carrier 58 and a timing system for the movement of elevator 34 up and down in synchronism with packages 30 in their stopping points an electrical drive and control system is required. For example, referring to FIG. 7, there are shown solenoids $S_1$, $S_2$, $S_3$, $S_4$, and $S_5$, at stopping points $p$, $q$, $r$, $s$, and $t$, respectively, all activated simultaneously by a battery or power source $E_1$, upon the closing of a switch SW1. The latter is held closed to move and until all the packages are up one stop where they are locked. A switch SW2 is then used to activate motor $M_1$ to raise elevator 34 carrying plaques 36 as previously described. When the top position of elevator 34 is reached a micro-switch K1 is activated by elevator 34 to set a timer $T_1$ in operation to activate motor $M_1$ after a finite period of time to move elevator 34 down, this being at the end of the period of desired irradiation.

This system just described is largely manual in nature, however, if desired, a fully automatic system of control may be utilized.

While only a preferred embodiment of this invention has been described it is understood that many modifications thereof may be made without departing from the scope of the invention as covered by the appended claims.

We claim:

1. A method for the controlled, sequential irradiation of a plurality of packages comprising the steps of forming said packages into a row, carrying said packages into a zone of irradiation by moving said packages along said row, stopping successive packages in said zone at spaced stop positions, inserting a flat plaque having at least one surface coated with a radioactive isotope emitting gamma rays between two successive stopped packages with one face of said plaque facing one of the aforesaid stopped packages and the opposite face of said plaque facing the other of the aforesaid stopped packages, said plaque thereby irradiating the facing packages and packages behind said facing packages,, retracting said plaque after a predetermined period of time and continuing the movement of said packages along the axis of said row until the packages in said zone reach other positions, stopping successive packages in said stop positions, and reinserting said plaque for a predetermined period of irradiation.

2. The method of claim 1 in which said plaque is coated on both sides with said radioactive isotope.

3. A method for the irradiation pasteurization of food packages of uniform size and shape comprising the steps of moving said packages into spaced stationary positions, placing a flat gamma-radiation source into a space between succeeding packages with the faces of said source facing said succeeding packages for irradiating the latter, retracting said source after a predetermined period of time, and indexing said packages a distance to cause the packages to come to rest with the next succeeding space between packages opposite said source to permit placing of the latter therein.

4. The method of claim 4 in which said food packages receive dosages of irradiation insufficient for complete sterilization but sufficient to reduce the requirements for refrigeration and extend the storage life of the food contained therein.

5. Apparatus for the controlled sequential irradiation of a plurality of packages comprising a zone of irradiation, means for transporting said packages through said zone, means within said zone for supporting at least one source of radiation, means for stopping said packages at spaced points in said zone, means for moving said supporting means to place said source between a pair of adjacent packages held in said spaced points and to withdraw said source atfer a predetermined period of time, and means for releasing said packages in said spaced points to permit said transporting means to index said packages to subsequent spaced points in said zone of irradiation.

6. The apparatus of claim 5 in which said source consists of a flat plaque having at least one surface coated with a radioactive isotope emitting gamma rays.

7. The apparatus of claim 6 in which said plaque when placed between a pair of adjacent packages has one side facing one of said adjacent packages and the opposite side facing the other adjacent package.

8. The apparatus of claim 7 in which said packages within said zone are in a straight line thereby permitting radiation from said plaque to penetrate the adjacent packages and irradiate successive packages in said row.

9. Apparatus for the controlled irradiation of packages of uniform size and shape comprising means for supporting said packages in a spaced aligned orientation, a source of gamma radiation, means for moving said source between a first position removed from said packages and a second position located in at least one space between succeeding packages, and means for indexing said packages a fixed distance while said source is in its first position for causing the next space between succeeding packages to fall in the second position of said source.

10. The apparatus of claim 9 in which said packages are in a straight line and said source is a flat member facing adjacent packages when oriented in said second position whereby packages along said line are irradiated with radiation penetrating intervening packages and thereby using said source efficiently without loss when in said second position.

11. Apparatus for the controlled sequential irradiation of a plurality of packages comprising a zone of irradiation, means for transporting said packages through said zone, means for supporting at least two spaced sources of radiation within said zone, means included in said transporting means for stopping said packages at spaced points in said zone, means for moving said supporting means to place said sources between pairs of adjacent packages held in said spaced points and to withdraw said sources after a predetermined period of time, and means included in said transporting means for releasing said packages in said spaced points to permit said transporting means to index said packages to other spaced points to permit said sources to be used for further irradiation.

12. The apparatus of claim 11 in which said sources produce gamma rays.

References Cited by the Examiner

UNITED STATES PATENTS

| | | | |
|---|---|---|---|
| 2,602,751 | 7/52 | Robinson | 99—221 |
| 2,729,748 | 1/56 | Robinson | 250—49.5 |
| 2,806,797 | 9/57 | Brasch et al. | 99—221 |
| 2,897,365 | 7/59 | Dewey et al. | 250—49.5 |

OTHER REFERENCES

Radiation Preservation of Food by USQMC, August, 1, 1957, pages 374, 388 and 389 relied on.

RALPH G. NILSON, *Primary Examiner.*

A. LOUIS MONACELL, *Examiner.*